US009777420B2

(12) United States Patent
Nash et al.

(10) Patent No.: US 9,777,420 B2
(45) Date of Patent: Oct. 3, 2017

(54) WASHING MACHINE APPLIANCE LID ASSEMBLY

(71) Applicant: General Electric Company, Schenectady, NY (US)

(72) Inventors: Jonathan Ian Nash, La Grange, KY (US); Sukalay Muniraj, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 249 days.

(21) Appl. No.: 14/589,371

(22) Filed: Jan. 5, 2015

(65) Prior Publication Data

US 2016/0194799 A1 Jul. 7, 2016

(51) Int. Cl.
| | |
|---|---|
| *D06F 37/18* | (2006.01) |
| *D06F 39/14* | (2006.01) |
| *B29C 65/08* | (2006.01) |
| *B29L 12/00* | (2006.01) |
| *B29L 31/00* | (2006.01) |
| *B29C 65/18* | (2006.01) |
| *B29C 65/48* | (2006.01) |
| *B29C 65/56* | (2006.01) |
| *B29C 65/00* | (2006.01) |

(52) U.S. Cl.
CPC .............. *D06F 37/18* (2013.01); *D06F 39/14* (2013.01); *B29C 65/08* (2013.01); *B29C 65/18* (2013.01); *B29C 65/48* (2013.01); *B29C 65/56* (2013.01); *B29C 66/112* (2013.01); *B29C 66/114* (2013.01); *B29C 66/3022* (2013.01); *B29C 66/5414* (2013.01); *B29L 2012/00* (2013.01); *B29L 2031/7406* (2013.01)

(58) Field of Classification Search
CPC ................................ D06F 37/18; D06F 39/14
USPC ............................................................ 68/196
See application file for complete search history.

(56) References Cited

U.S. PATENT DOCUMENTS

| | | | | |
|---|---|---|---|---|
| 6,766,596 | B1 * | 7/2004 | Bienick .................... | D06F 39/14 34/601 |
| 8,151,603 | B2 | 4/2012 | Kang et al. | |
| 8,276,409 | B2 * | 10/2012 | Tooker ..................... | D06F 39/14 49/501 |
| 8,511,115 | B2 | 8/2013 | Kim et al. | |
| 2004/0106703 | A1 * | 6/2004 | Etzrodt .................... | B32B 27/08 523/330 |
| 2006/0254323 | A1 * | 11/2006 | Kim ........................ | D06F 39/14 68/235 R |
| 2009/0229313 | A1 * | 9/2009 | Yoo ......................... | D06F 39/14 68/12.26 |
| 2011/0050060 | A1 * | 3/2011 | Kim ......................... | D06F 23/04 312/228 |
| 2011/0062837 | A1 * | 3/2011 | Kim ......................... | D06F 23/04 312/228 |

(Continued)

*Primary Examiner* — Joseph L Perrin
(74) *Attorney, Agent, or Firm* — Dority & Manning, P.A.

(57) ABSTRACT

A washing machine appliance including a cabinet, a tub positioned within the cabinet, and a basket rotatably mounted within the tub is provided. The cabinet defines an opening at a top end to allow a user to access the basket. A lid assembly is positioned over the opening of the cabinet and includes a perimeter frame, a pair of hinge brackets positioned at least partially in the perimeter frame, and a transparent panel attached directly to the hinge brackets.

16 Claims, 9 Drawing Sheets

(56) References Cited

U.S. PATENT DOCUMENTS

| | | | |
|---|---|---|---|
| 2011/0089793 A1* | 4/2011 | Kim | D06F 39/14 312/228 |
| 2011/0121694 A1* | 5/2011 | Kim | D06F 39/14 312/204 |
| 2011/0296630 A1* | 12/2011 | Frazer | D06F 39/14 8/159 |
| 2014/0021842 A1 | 1/2014 | Bernal et al. | |
| 2014/0116097 A1* | 5/2014 | Park | D06F 39/14 68/196 |
| 2014/0210324 A1* | 7/2014 | Kilgore | D06F 39/14 312/228.1 |

* cited by examiner

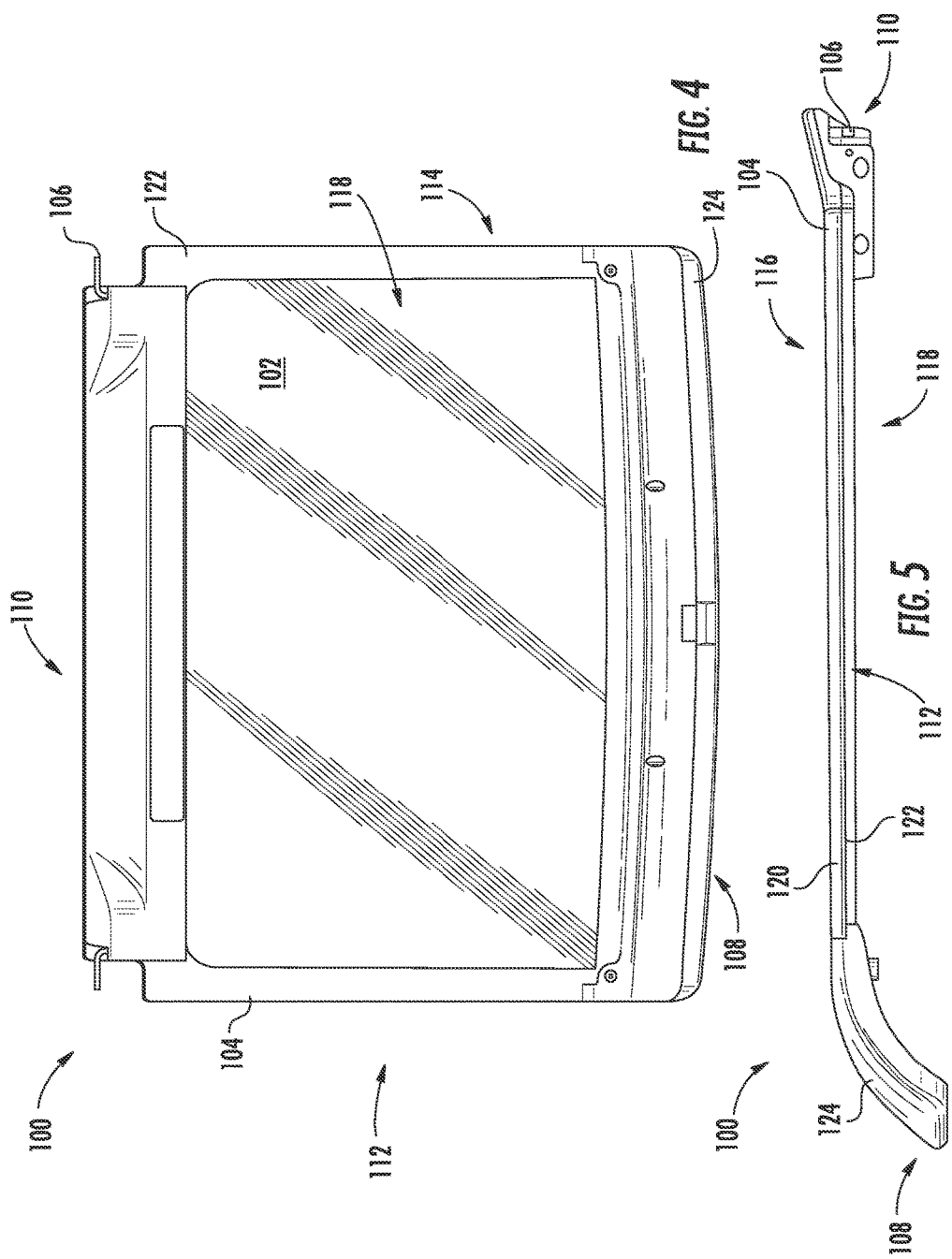

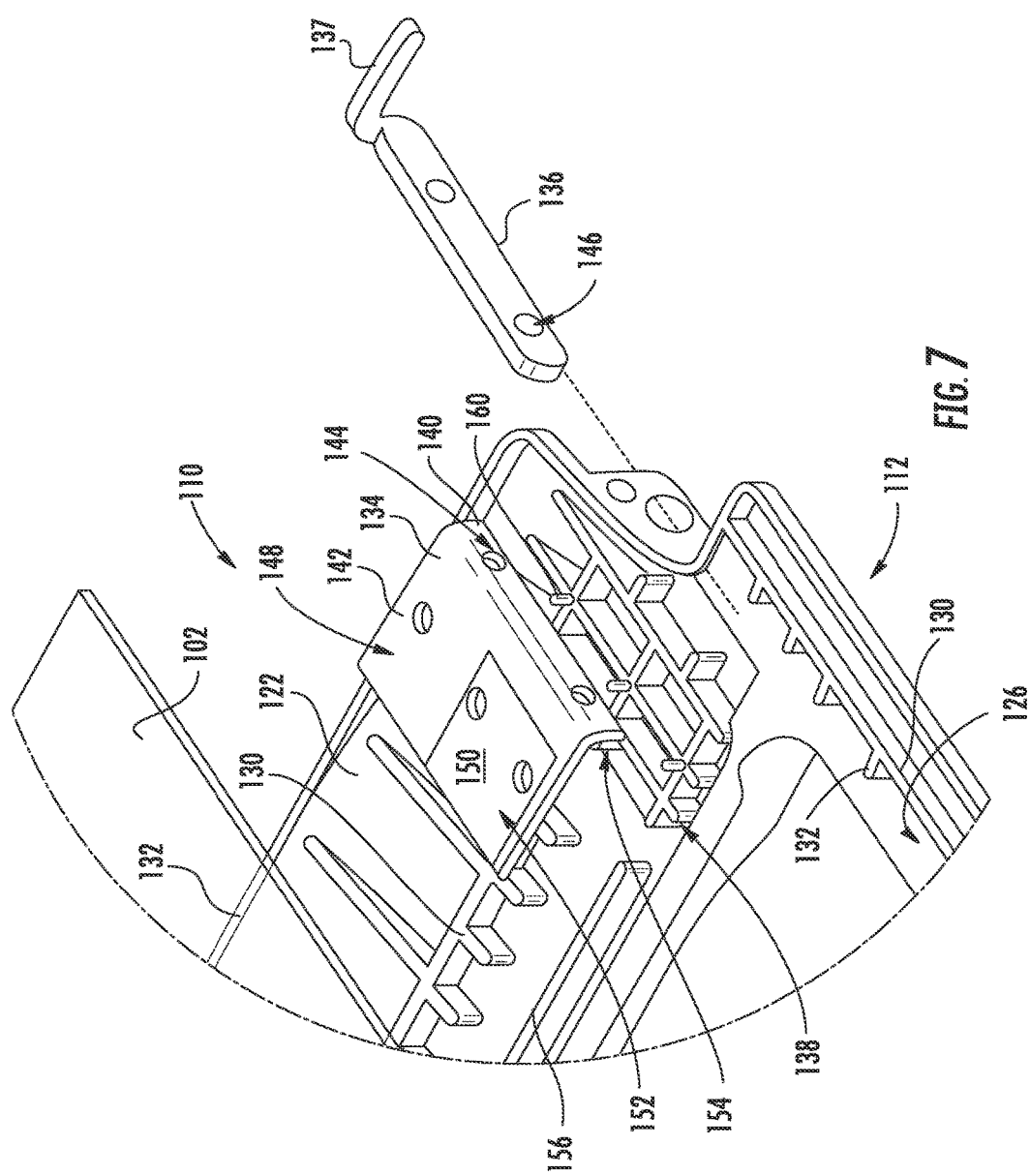

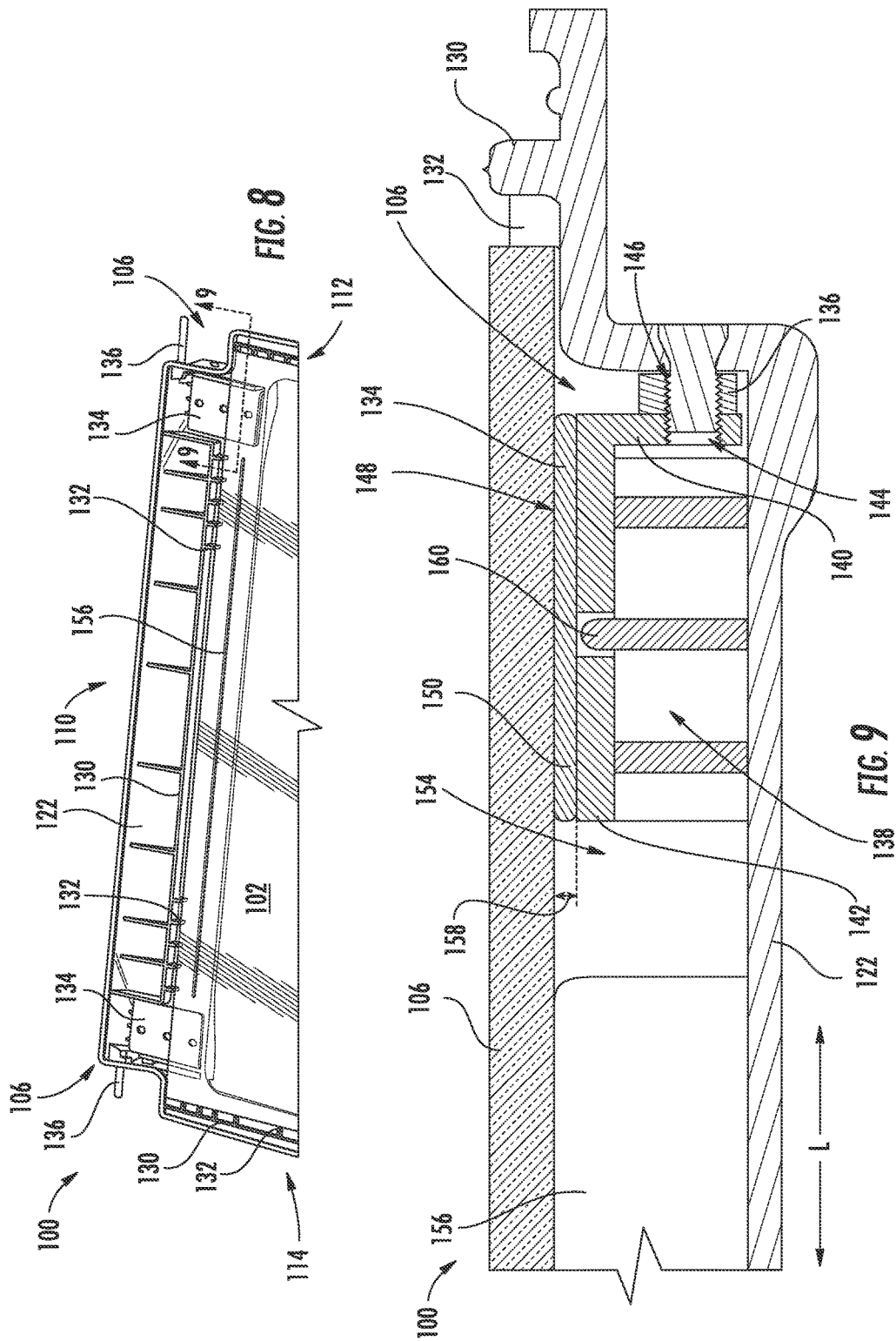

WASHING MACHINE APPLIANCE LID ASSEMBLY

FIELD OF THE INVENTION

The present disclosure relates generally to washing machine appliances, and more particularly to lid assemblies for washing machine appliances.

BACKGROUND OF THE INVENTION

Washing machine appliances generally include a cabinet including a tub for containing wash fluid, e.g., water and detergent, bleach, and/or other fluid additives. A basket is rotatably mounted within the tub and defines a wash chamber for receipt of articles for washing. During operation of such washing machine appliances, wash fluid is directed into the tub and onto articles within the wash chamber of the basket. The basket and/or an agitation element can rotate at various speeds to, e.g., agitate articles within the wash chamber, wring wash fluid from articles within the wash chamber, etc.

A lid assembly is provided to allow a user to selectively access the wash chamber of the basket. For example, the lid assembly may be movable between an open position, wherein a user can add or remove clothes from the wash chamber, and a closed position, wherein the washing machine appliance may be operable to wash the clothes or other articles positioned within the wash chamber.

Lid assemblies in certain washing machine appliances are provided with a glass pane allowing a user to, e.g., look into the wash chamber of the basket when the lid assembly is in the closed position. Such lid assemblies generally include a plastic frame housing the glass pane and attached to the cabinet of the wash machine appliance. However, with such a configuration, the various forces on the lid assembly over time can cause creep of the plastic perimeter frame and/or fracture the plastic perimeter frame.

Accordingly, a more durable lid assembly including a glass pane would be beneficial. More particularly, a lid assembly including a glass pane with a plastic perimeter frame that is resistant to creep and/or fractures would be particularly useful.

BRIEF DESCRIPTION OF THE INVENTION

Aspects and advantages of the invention are set forth below in the following description, or may be obvious from the description, or may be learned through practice of the invention.

In accordance with one exemplary embodiment of the present disclosure, a washing machine appliance is provided defining a vertical direction. The washing machine appliance includes a cabinet defining a top end along the vertical direction. The washing machine appliance also includes a tub positioned within the cabinet and a basket rotatably mounted within the tub. The cabinet defines an opening at the top end to allow a user to access the basket. The washing machine appliance also includes a lid assembly positioned over the opening of the cabinet. The lid assembly includes a perimeter frame and a pair of hinge brackets positioned at least partially in the perimeter frame. The hinge brackets attach the lid assembly to the cabinet over the opening of the cabinet. The lid assembly additionally includes a transparent panel attached directly to each of the hinge brackets.

In accordance with an exemplary aspect of the present disclosure, a method is provided for manufacturing a lid assembly for a washing machine appliance. The method includes placing a transparent panel on a first frame member of a perimeter frame and placing a second frame member of the perimeter frame over the first frame member of the perimeter frame and over at least a portion of the transparent panel. The method also includes applying a force to one or both of the first frame member and the second frame member such that an inside lip of the second frame member is pressed against the transparent panel. The method also includes welding the first and second frame members together such that the inside lip of the second frame member remains pressed against the transparent panel and forms a seal with the transparent panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 provides a bottom view of the exemplary lid assembly of FIG. 2.

FIG. 5 provides a side view of the exemplary lid assembly of FIG. 2.

FIG. 7 provides a close up view of Section 7-7 in FIG. 6.

FIG. 8 provides a close up perspective view of a rear end of the exemplary lid assembly of FIG. 2, with a top frame member removed for clarity.

FIG. 9 provides a cross-sectional view of a rear end of the exemplary lid assembly of FIG. 2, taken along Line 9-9 of FIG. 8.

DETAILED DESCRIPTION

Figure 1:
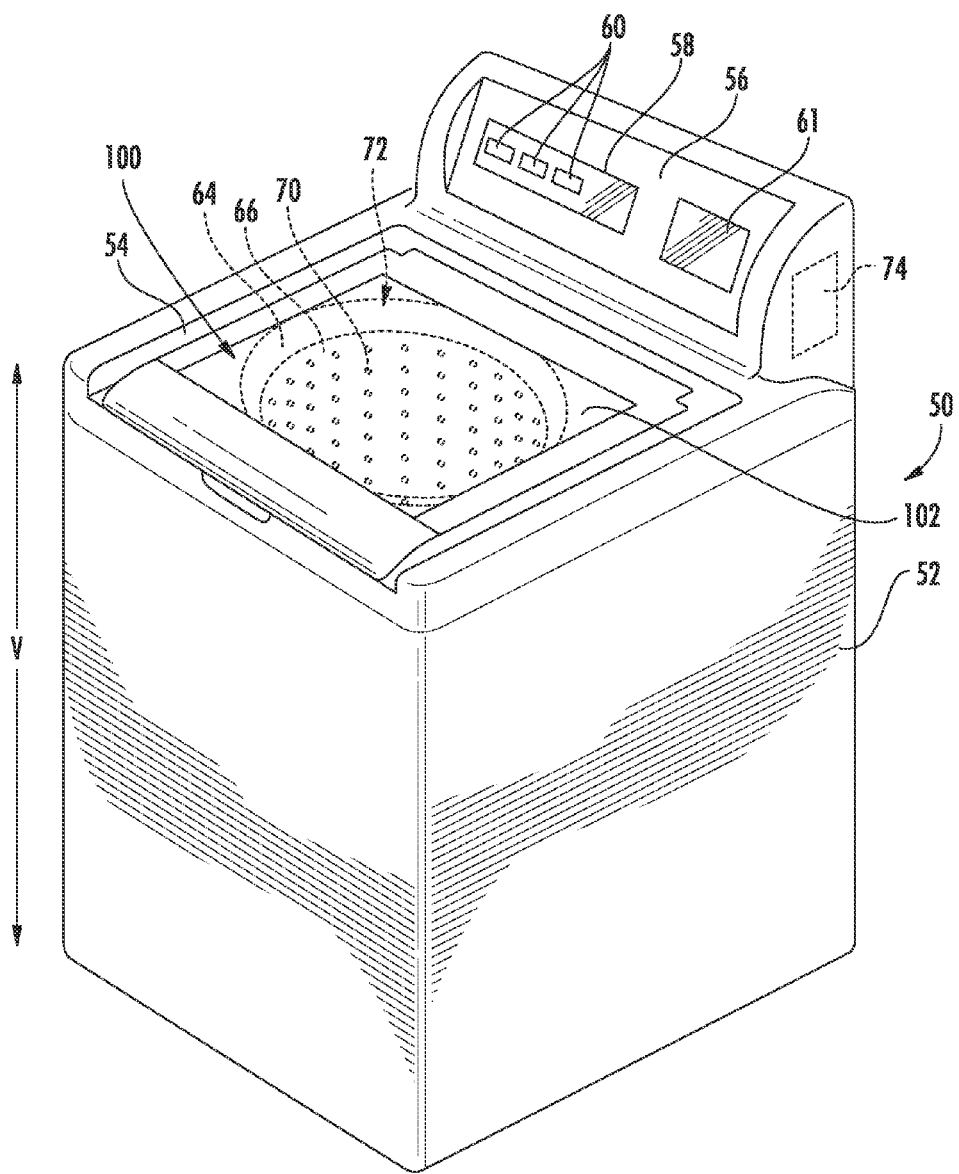
FIG. 1 provides a perspective view of a washing machine appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a washing machine appliance 50 according to an exemplary embodiment of the present subject matter. As may be seen in FIG. 1, washing machine appliance 50 includes a cabinet 52, the cabinet 52 including a cover 54 and a backsplash 56. Backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment, a display 61 indicates selected features, a countdown timer, and/or other potential items of interest to machine users.

The washing machine appliance 50 depicted in FIG. 1 extends generally along a vertical direction V between a top end 20 and a bottom end 22. Additionally, as will be described in greater detail below, a lid assembly 100 is provided, the lid assembly 100 mounted to cover 54 of cabinet 52. Lid assembly 100 in the exemplary embodiment depicted includes a transparent panel 102, which may be formed of, for example, glass, plastic, or any other suitable material. The transparency of the panel 102 allows users to see through the panel 102 when the lid assembly 100 is in the closed position. As may be seen through transparent panel 102, washing machine appliance 50 further includes a tub 64 positioned within cabinet 52. Further, a wash drum or wash basket 66 is rotatably mounted within tub 64. In particular, basket 66 is rotatable about the vertical direction V. Thus, washing machine appliance 50 is generally referred to as a "vertical axis washing machine appliance." Basket 66 defines a wash chamber for receipt of articles for washing. Additionally, basket 66 includes a plurality of openings or perforations 70 therein to facilitate fluid communication between an interior of basket 66 and tub 64.

Cabinet 52 further defines an opening 72 at a top end along the vertical direction V to allow a user to access the basket 66. Lid assembly 100 is positioned over opening 72 of cabinet 52 and is rotatable between an open position (not shown) facilitating access to wash tub 64 and wash basket 66 located within cabinet 52, and a closed position (shown in FIG. 1) forming an enclosure over tub 64.

Operation of washing machine appliance 50 is controlled by a processing device or controller 74 (shown in phantom), that is operatively coupled to the input selectors 60 located on washing machine backsplash 56 for user manipulation to select washing machine cycles and features. Controller 74 may further be operatively coupled to various other components of appliance 50, such as various valves, pressure and/or temperature sensors, and other suitable sensors, etc. In response to user manipulation of the input selectors 60, controller 74 may operate the various components of washing machine appliance 50 to execute selected machine cycles and features.

Controller 74 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 74 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 may be in communication with controller 74 via one or more signal lines or shared communication busses.

It should be appreciated, however, that while described in the context of a specific embodiment of washing machine appliance 50, using the teachings disclosed herein it will be understood that washing machine appliance 50 is provided by way of example only. Other washing machine appliances having different configurations (such as horizontal-axis washing machine appliances), different appearances, and/or different features may also be utilized with the present subject matter as well.

Figure 2:
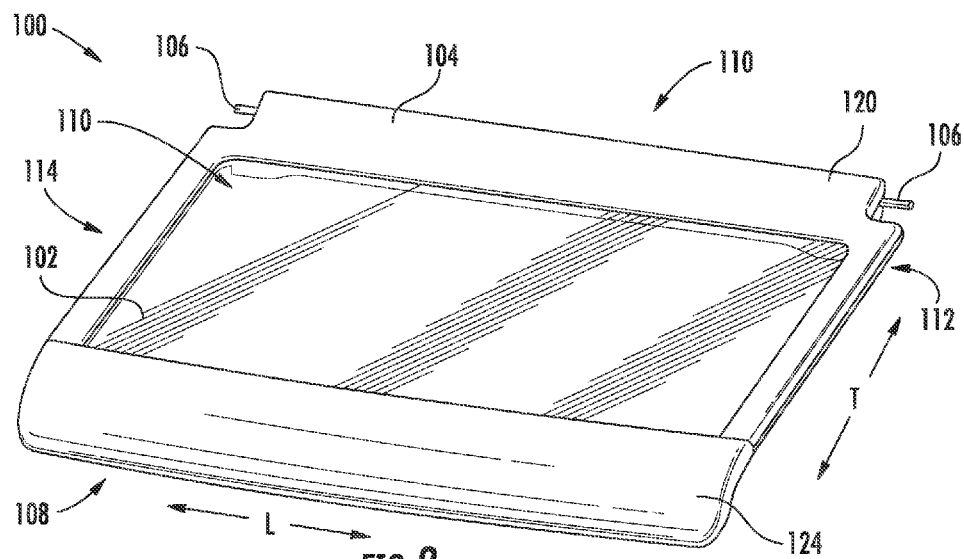
FIG. 2 provides a perspective view of a lid assembly of the exemplary washing machine appliance of FIG. 1.
Figure 3:
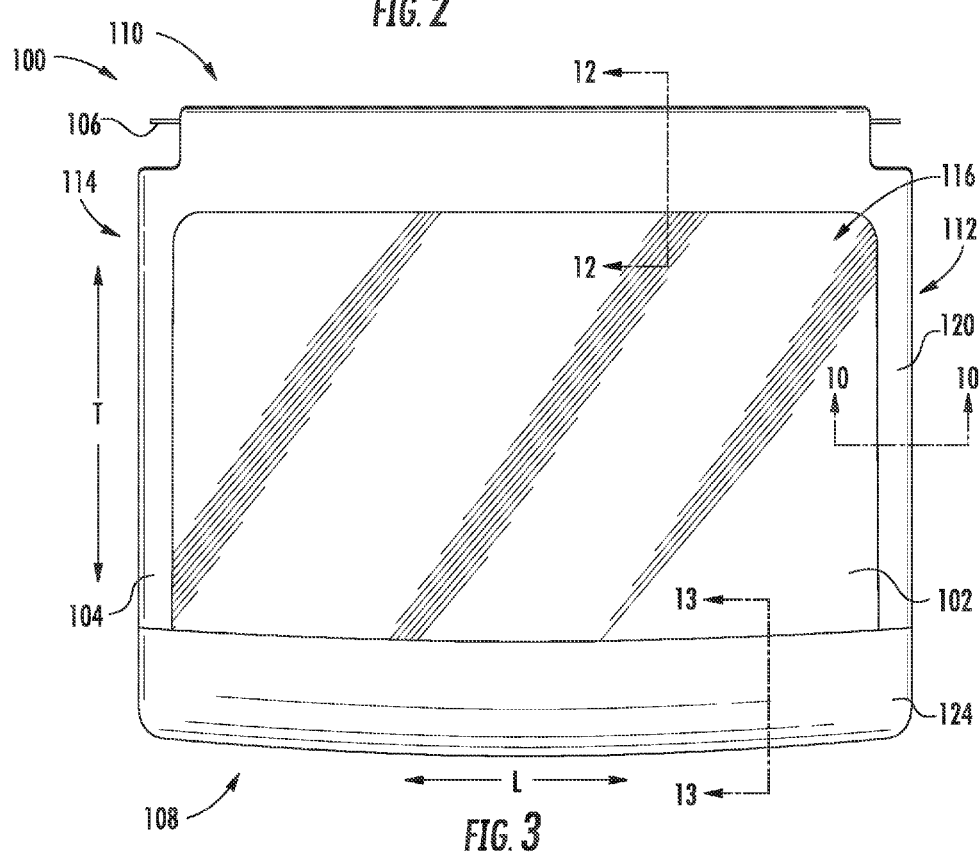
FIG. 3 provides a top plan view of the exemplary lid assembly of FIG. 2.

Referring now generally to FIGS. 2 through 5, the exemplary lid assembly 100 of FIG. 1 will be described in greater detail. More particularly, FIG. 2 provides a perspective view of the exemplary lid assembly 100 of FIG. 1; FIG. 3 provides a top plan view of the exemplary lid assembly 100 of FIG. 1; FIG. 4 provides a bottom view of the exemplary lid assembly 100 of FIG. 1; and FIG. 5 provides a side view of the exemplary lid assembly 100 of FIG. 1.

As shown, lid assembly 100 generally includes a perimeter frame 104, a pair of hinge brackets 106, and transparent panel 102. Hinge brackets 106 are depicted positioned at least partially in perimeter frame 104 and are used to attach lid assembly 100 to cabinet 52 over opening 72 of cabinet 52. As will be discussed in greater detail below, transparent panel 102 is attached directly to each of the hinge brackets 106 such that a force on transparent panel 102 may be transferred from transparent panel 102, through hinge brackets 106, and to cabinet 52 of washing machine appliance 50. More particularly, transparent panel 102 is connected to cabinet 52 of washing machine appliance 100 directly through hinge brackets 106, and not through perimeter frame 104.

Lid assembly 100 defines a lateral direction L and a transverse direction T. Additionally, lid assembly 100 defines a front side, or front end 108 and a rear side, or rear end 110 at opposing ends along the transverse direction T, as well as a first side 112 and a second side 114 at opposing sides along the lateral direction L. Perimeter frame 104 extends around all four sides 108, 110, 112, 114 of lid assembly 100 and includes a top frame member 120, a bottom frame member 122, and a trim member 124. As will be discussed in greater detail below, top and bottom frame members 120, 122 extend around and enclose a peripheral edge 125 (FIG. 6) of the transparent panel 102. Lid assembly 100 also defines a top side 116 (FIG. 3) and a bottom side 118 (FIG. 4).

Figure 6:
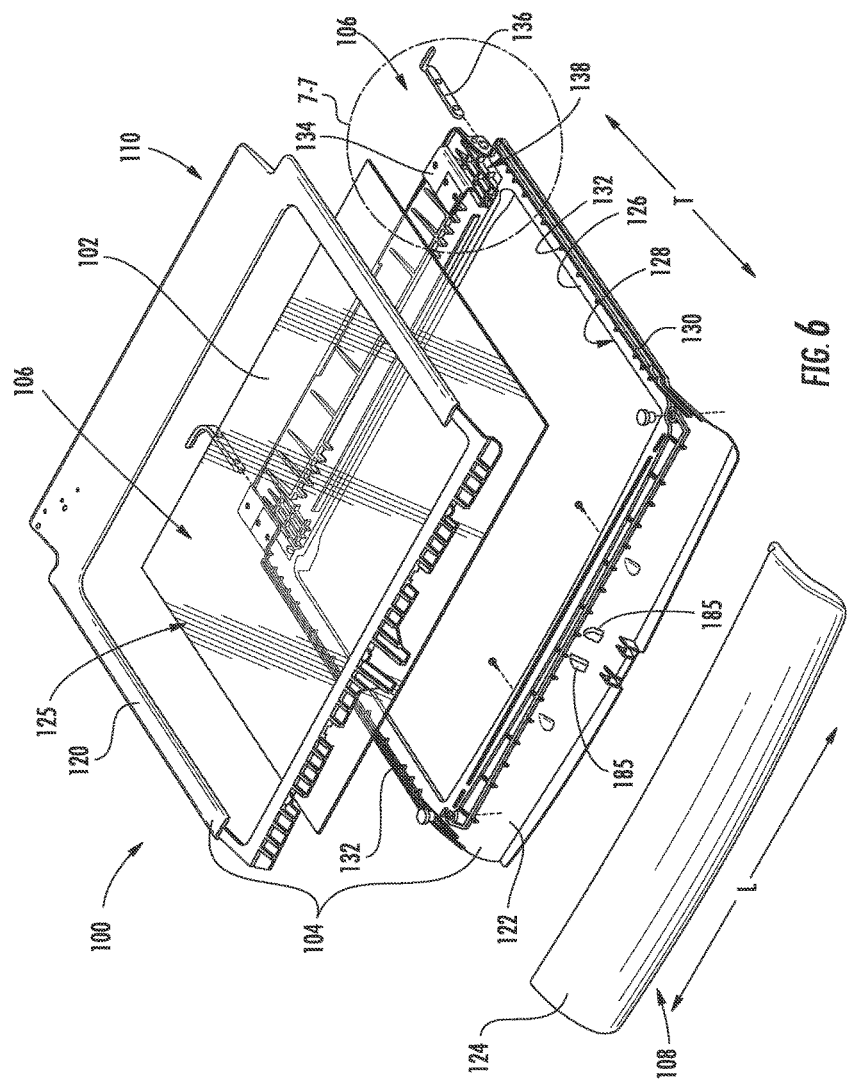
FIG. 6 provides an exploded perspective view of the exemplary lid assembly of FIG. 2.

Reference now will be made to FIGS. 6 through 8. FIG. 6 provides an exploded perspective view of the exemplary lid assembly 100 of FIG. 1; FIG. 7 provides a close-up view of Section 7-7 of FIG. 6; and FIG. 8 provides a close-up view of rear end 110 of lid assembly 100 with the top frame member 120 removed for clarity.

As shown, bottom frame member 122 includes an inner ledge 126 extending around at least a portion of an inner perimeter 128 of bottom frame member 122. Transparent panel 102 is configured to be received on inner ledge 126 of bottom frame member 122. Bottom frame member 122 further includes locating features to ensure transparent panel 102 is properly oriented on bottom frame member 122. For example, bottom frame member 122 includes longitudinal ribs 130 extending along first side 112 and second side 114 along transverse direction T, and along the front end 108 and rear end 110 along lateral direction L. Additionally, bottom frame member 122 includes a plurality of locating ribs 132 extending inwardly from each of the longitudinal ribs 130. As used herein, the term "inwardly" refers to a relative direction directed generally towards a center of lid assembly 100. The locating ribs 132 depicted abut respective sides of transparent panel 102 to ensure transparent panel 102 is properly oriented and positioned on bottom frame member 122. In other exemplary embodiments, however, any other suitable locating features may be provided to ensure transparent panel 102 is properly oriented on bottom frame member 122.

Each pair of hinge brackets 106 includes an L-bracket 134 and a hinge pin 136. L-brackets 134 and hinge pins 136 may each be made of a suitable metal material, such as steel. When assembled, L-brackets 134 and hinge pins 136 of a respective hinge bracket 106 are rigidly attached to one another (see FIG. 8). Additionally, the perimeter frame 104, or more particularly, the bottom frame member 122 of the perimeter frame 104, includes a seat 138 for each L-bracket 134. A side flange 140 of each respective L-bracket 134 extends perpendicularly from a base 142 of each respective L-bracket 134 around an outer side of seat 138. Bottom frame member 122 further includes a pair of slots (not shown) at rear end 110 of lid assembly 100, through which respective hinge pins 136 may be inserted. When inserted, threaded openings 144 in the side flanges 140 of the L-brackets 134 align with openings 146 in the respective hinge pins 136. Accordingly, L-brackets 134 and respective hinge pins 136 may be attached using, e.g., one or more screws or bolts.

It should be appreciated, however, that in other exemplary embodiments, hinge brackets 106 may have any other suitable configuration. For example, in other exemplary embodiments, L-brackets 134 may be attached to respective hinge pins 136, e.g., by welding or using rivets or a suitable adhesive. Alternatively, however, hinge brackets 106 in still other embodiments may each be a single component. Moreover, although hinge brackets 106 are depicted as including hinge pins 136 with respective attachment ends 137 extending along lateral direction L (allowing lid assembly 100 to be rotatably attached to respective openings in cabinet 52), in other exemplary embodiments, lid assembly 100 may additionally or alternatively include hinge brackets 106 configured, e.g., as barrel hinges, pivot hinges, flag hinges, or any other suitable type of hinge. Additionally, hinge brackets 106 may additionally or alternatively be positioned at any other suitable location along rear end 110 of lid assembly 100.

Referring still to FIGS. 6 through 8, transparent panel 102 is attached directly to hinge brackets 106. More particularly, transparent panel 102 is attached directly to a top surface 148 of each respective hinge bracket 106, or more particularly to top surface 148 of each respective L-bracket 134. Transparent panel 102 may be attached to top surface 148 using an adhesive 150, such that the adhesive 150 extends between transparent panel 102 and hinge bracket 106, attaching the two components. For example, in certain embodiments, a urethane adhesive or an acrylic adhesive may be utilized to attach transparent panel 102 directly to top surface 148. During manufacture of lid assembly 100, the adhesive 150 may be cured using UV light. Notably, transparent panel 102 may be a tempered glass material having any suitable thickness. For example, transparent panel 102 may be a tempered glass material having a thickness of between about four millimeters (mm) and about ten mm, or alternatively between about five mm and about eight mm. In other embodiments, however, any other suitable thickness may be used. It should be appreciated, that as used herein, terms of approximation, such as "approximately," "about," or "substantially," refer to being within a ten percent margin of error.

In certain exemplary embodiments, top surface 148 may define an attachment area 152 greater than or equal to about one square inch. However, in other embodiments, top surface 148 may define an attachment area 152 greater than or equal to about one and a half (1½) square inches, greater than or equal to about one and three-quarter (1¾) square inches, or any other suitable attachment area. Such a configuration may ensure forces on transparent panel 102 can be transferred to hinge brackets 106 without damaging transparent panel 102.

Perimeter frame 104, or more particularly, bottom frame member 122 of perimeter frame 104, additionally defines an overflow channel 154 proximate to each seat 138 for receipt of excess adhesive 150 during manufacture of lid assembly 100. Such a configuration allows for providing hinge bracket 106 with more adhesive than is minimally required for attachment of transparent panel 102 to hinge bracket 106. For example, top surface 148 of each respective hinge bracket 106 may be provided with excess adhesive, such that when transparent panel 102 is attached to hinge bracket 106, at least a minimally required amount of adhesive is ensured to be used to attach the two components. Any excess adhesive may flow into overflow channel 154 proximate to respective seat 138 to prevent such excess adhesive from traveling into a visible area of transparent panel 102.

Referring now also to FIG. 9, a cross-sectional view of lid assembly 100 along Line 9-9 in FIG. 8 is provided. As shown, perimeter frame 104 includes means for offsetting transparent panel 102 from hinge bracket 106. More particularly, bottom frame member 122 includes means for offsetting transparent panel 102 from top surface 148 of hinge bracket 106. For the exemplary embodiment depicted, such means includes a ridge 156 extending along bottom frame member 122 at rear end 110 and along the lateral direction L. As is depicted in FIG. 9, the transparent panel 102 is configured to rest on top of ridge 156 such that transparent panel 102 sits slightly above top surface 148 of hinge bracket 106. Such a configuration may allow for transparent panel 102 to be offset a consistent amount from each hinge bracket 106. More particularly, such a configuration allows transparent panel 102 to define a gap 158 with respect to top surface 148 of each hinge 106. The gap 158, or offset amount, may be between about two thousandths of an inch and about fifty thousandths of an inch. However, in other exemplary embodiments, the gap 158 may instead be between about ten thousandths of an inch and forty thousandths of an inch. The gap 158 may be sized according to the chosen adhesive to ensure a desired amount of such adhesive is utilized.

It should be appreciated, however, that the exemplary means for offsetting transparent panel 102 from hinge bracket 106 depicted in FIG. 9 is by way of example only. For example, in other exemplary embodiments of the present disclosure, means for offsetting transparent panel 102 from hinge bracket 106 may include locating knobs 160 on each respective seat 138 in bottom frame member 122 being sized such that one or more locating knobs 160 extend through hinge brackets 106, or more particularly, extend through L-brackets 134 and past top surface 148, such that that transparent panel 102 rests on locating knobs 160 and is offset from top surface 148 of each hinge bracket 106.

Figure 10:
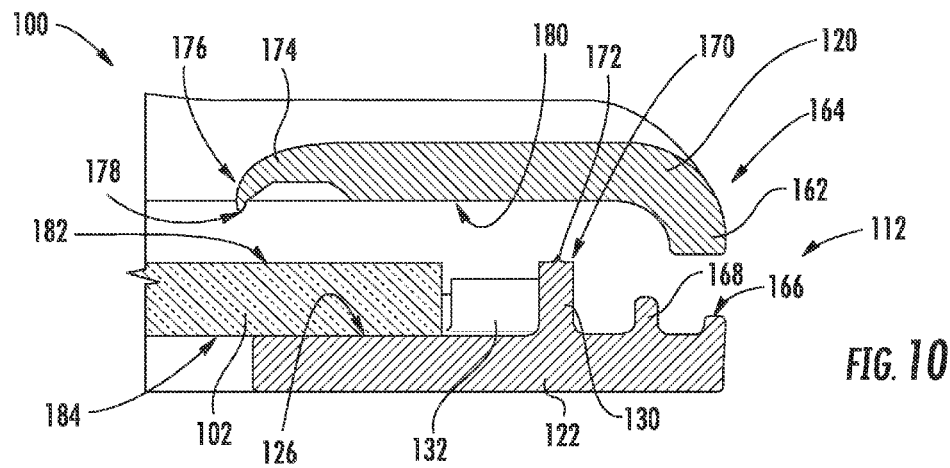
FIG. 10 provides a cross-sectional view of a first side of the exemplary lid assembly of FIG. 2, taken along Line 10-10 in FIG. 3, with a top frame member and a bottom frame member unattached.
Figure 11:
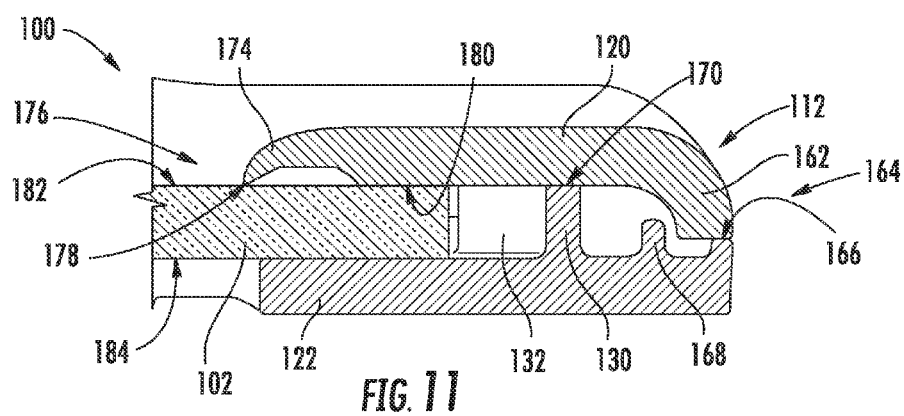
FIG. 11 provides a cross-sectional view of a first side of the exemplary lid assembly of FIG. 2, taken along Line 10-10 in FIG. 3, with the top frame member and the bottom frame member attached.
Figure 12:
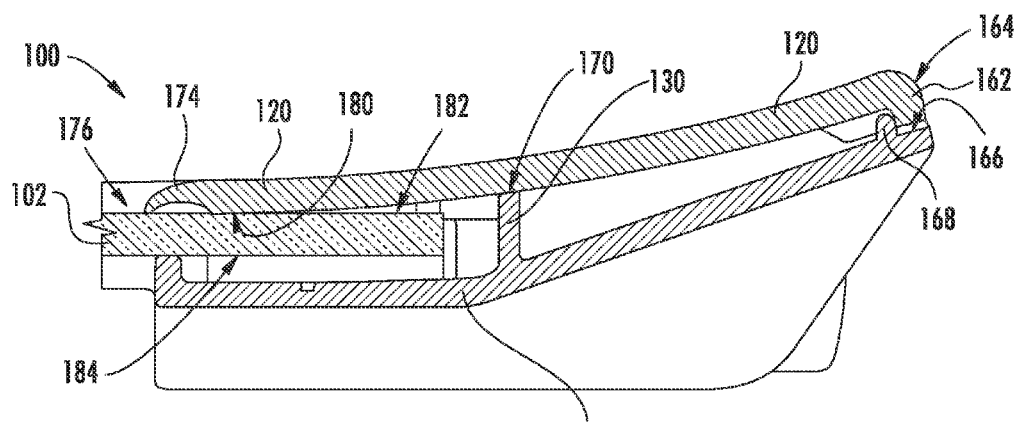
FIG. 12 provides a cross-sectional view of a rear end of the exemplary lid assembly of FIG. 2, taken along Line 12-12 in FIG. 3.

Referring now to FIGS. 10 through 12, cross-sectional views are provided of first side 112 of lid assembly 100 and of rear end 110 of lid assembly 100. More particularly, FIG. 10 provides a cross-sectional view of lid assembly 100 along Line 10-10 in FIG. 3 prior to attachment of top frame member 120 and bottom frame member 122; FIG. 11 provides a cross-sectional view of first side 112 of lid assembly 100 along Line 10-10 in FIG. 3 after top frame member 120 and bottom frame member 122 have been attached; and FIG. 12 provides a cross-sectional view of rear end 110 of lid assembly 100 along Line 12-12 in FIG. 3.

As stated, transparent panel 102 is placed on inner ledge 126 of bottom frame member 122 and locating features, e.g., locating ribs 132, are provided to ensure proper orientation of transparent panel 102 on bottom frame member 122. Additionally, as is depicted in FIGS. 10 through 12, top frame member 120 includes a peripheral lip 162 extending along an outside edge 164 of top frame member 120 along first side 112, rear end 110, and second side 114 of lid assembly 100. Peripheral lip 162 is configured to rest on an outer edge 166 of bottom frame member 122. Bottom frame member 122 further includes an outer locating member 168 positioned proximate to outer edge 166 of bottom frame member 122 to ensure top frame member 120 is properly oriented and positioned on bottom frame member 122.

In certain exemplary embodiments, top frame member 120 and bottom frame member 122 may be attached using a welding process. For example, top frame member 120 and bottom frame 122 may be attached using an ultrasonic welding process. In such an embodiment, longitudinal ribs 130 provide for an attachment point between a top frame member 120 and bottom frame member 122. Referring particularly to FIG. 10, a top surface 170 of longitudinal ribs 130 includes an elevated point 172 extending from longitudinal rib 130 towards top frame member 120. The elevated point 172 may act as an energy director during attachment of top frame member 120 to bottom frame member 122. Such a configuration may allow for a more efficient manufacturing process.

It should be appreciated, however, that in other exemplary embodiments, the top frame member 120 and bottom frame member 122 may instead be attached in any other suitable manner. For example, in other exemplary embodiments, the top and bottom frame members 120, 122 may additionally or alternatively be attached using a hot plate welding process. In such a configuration, the longitudinal ribs 130 providing for an attachment point may be narrowed to prevent formation of, e.g., sink marks on top frame member 122. Additionally, or alternatively, top and bottom frame members 120, 122 may be attached using one or more mechanical fasteners, such as screws, bolts, rivets, etc., or using a suitable adhesive.

Referring still to FIGS. 10 through 12, top frame member 120 includes an inside lip 174 extending longitudinally along an inner perimeter 176 along first side 112, rear end 110, and second side 114 of lid assembly 100. Referring particularly to FIG. 10, a tip 178 of the inside lip 174 extends through a plane defined by a bottom surface 180 of top frame member 120 when in a relaxed state. By contrast, however, referring now to FIGS. 11 and 12, top frame member 120 and bottom frame member 122 are attached with the inside lip 174 deformed by transparent panel 102 such that inside lip 174 is pressed against and forms a seal with a top surface 182 of transparent panel 102. Accordingly, first and second frame members 120, 122 may be attached such that inside lip 174 of top frame member 120 remains pressed against top surface 182 of transparent panel 102 after attachment. Such a configuration may further allow inner ledge 126 of bottom frame member 122 to similarly form a seal with a bottom surface 184 of transparent panel 102, and prevent an amount of steam or other fluids from, e.g., a wash cycle in wash basket 66 from traveling into perimeter frame 104 and/or through lid assembly 100.

Referring still to FIGS. 10 through 12, as well as back to FIG. 6, top frame member 120 of the perimeter frame 104 may be made of a plastic including metallic flake and formed using, e.g., an injection molding process. As used herein, "plastic including metallic flake" refers to any metallic-pigmented plastic. Notably, top frame member 120 defines a geometry having substantially smooth surfaces along first side 112, rear end 110, and second side 114 of lid assembly 100. More particularly, the substantially smooth surfaces of top frame member 120 are free from any surface interruptions, such as, ribs, cavities, channels, etc. Such a configuration may allow for top frame member 120 to be free from any flowlines or other aesthetic irregularities visible on top frame member 120 at first side 112, rear end 110, and second side 114 of lid assembly 100 when formed with a plastic including metallic flake. Accordingly, such a configuration may allow for formation of top frame member 120 without requiring such component to be painted or otherwise finished. In certain exemplary embodiments, the plastic including metallic flake may be an acrylonitrile butadiene styrene (ABS) plastic, a poly(vinyl chloride) (PVC) plastic, or any other suitable plastic.

Figure 13:
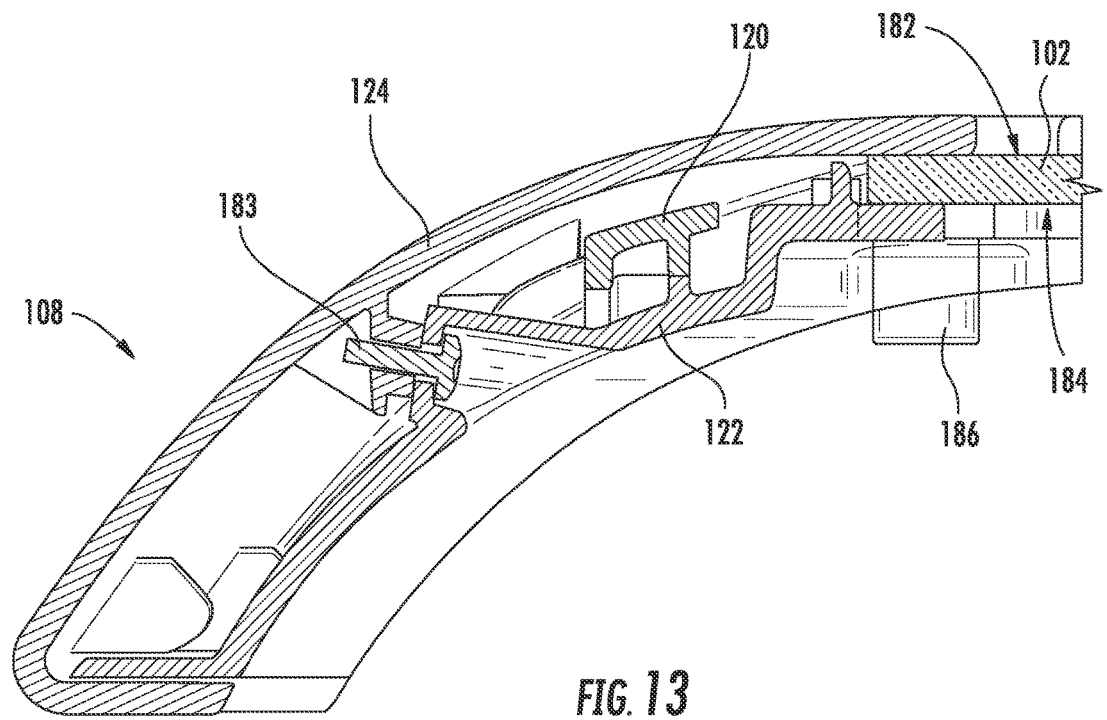
FIG. 13 provides a cross-sectional view of a front end of the exemplary lid assembly of FIG. 2, taken along Line 13-13 in FIG. 3.

Referring now to FIG. 13, a cross-sectional view of front end 108 of lid assembly 100 along Line 13-13 of FIG. 3 is provided. As shown, and previously stated, lid assembly 100 further includes a trim member 124. Referring also to FIG. 6, top frame member 120 along front end 108 of lid assembly 100 includes structural components. Accordingly, top frame member 120 at front end 108 of lid assembly 100 does not define a substantially smooth surface, which may lead to flowlines, streaks, or other aesthetically problematic features visible on the surface of top frame member 120 at front end 108 of lid assembly 100 when top frame member 120 is made using a plastic with metallic flake. Thus, trim member 124 is attached at front end 108 of lid assembly 100 covering top frame member 120 at front end 108. Trim member 124 may be, e.g. a chromed trim member 124, or alternatively may be painted. Additionally, for the embodiment depicted, trim member 124 is attached to top and/or bottom frame members 120, 122 using a plurality of mechanical fasteners. More specifically, for the embodiment depicted, trim member 124 is attached to bottom frame member 122 using a plurality of screws 183 extending through the bottom frame member 122. However, in other exemplary embodiments, trim member 124 may instead be attached to bottom frame member 122 and/or top frame member 120 in any other suitable manner. For example, in other exemplary embodiments, trim member 124 may be attached using one or more "snap" attachments, using a suitable adhesive, or using a welding process, such as ultrasonic welding or hot plate welding.

In certain embodiments, trim member 124 may cover or enclose one or more sensors or components thereof. For example, lid assembly 100 depicted in FIG. 6 includes a pair of magnets 185 received in a pair of slots (not shown) that may be used to indicate whether lid assembly 100 is in an open position or closed position (FIG. 1). The magnets may be sensed by a device in the cabinet 52 to provide such functionality.

Figure 14:
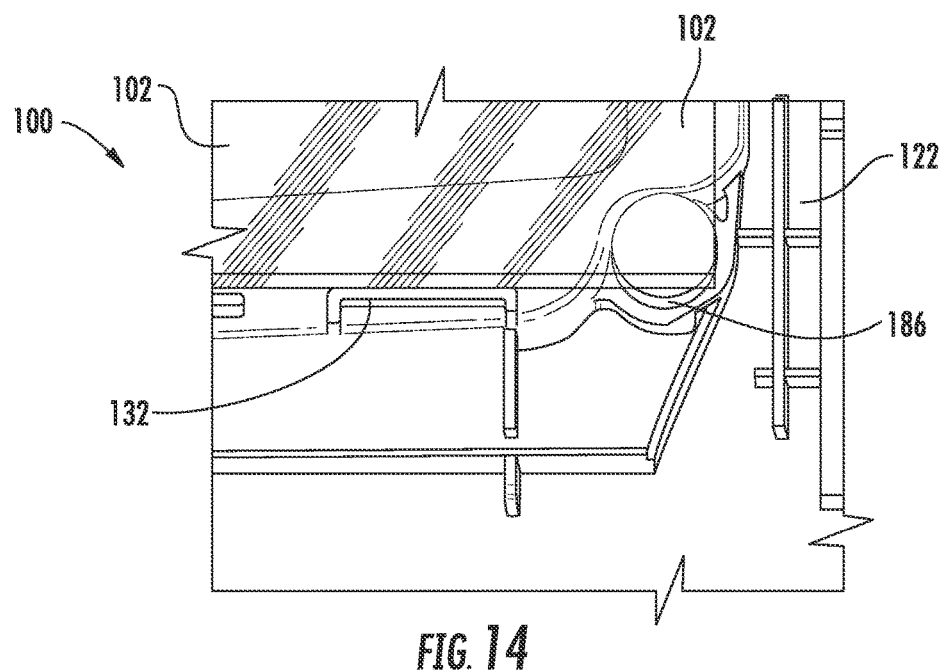
FIG. 14 provides a top view of the exemplary lid assembly of FIG. 2, at a front end of the exemplary lid assembly proximate to a first side of the exemplary lid assembly, with a top frame member removed for clarity.

Reference will now be made to FIG. 14, as well as back to FIG. 6. FIG. 14 provides a top view of lid assembly 100 with top frame member 120 removed. More particularly, FIG. 14 provides a top view of lid assembly 100 at front end 108 proximate to first side 112 with top frame member 120 removed. As shown, lid assembly 100 further includes a bumper 186 positioned on bottom surface 184 of transparent panel 102 at front end 108 of lid assembly 100. Moreover, as is shown in FIG. 6, lid assembly 100 further includes a pair of bumpers 186—a first bumper 186 positioned on bottom surface 184 of transparent panel 102 at front end 108 proximate to the first side 112 (shown in FIG. 14) and a second bumper 186 positioned on bottom surface 184 of transparent panel 102 at front end 108 proximate to the second side 114 (see also FIGS. 4 and 5). Bumpers 186 are configured to contact cabinet 52 of washing machine appliance 50 when lid assembly 100 is in a closed position. Accordingly, bumpers 186 may transfer a force from transparent panel 102 to cabinet 52. More particularly, bumpers 186 may transfer a force from transparent panel 102 directly to cabinet 52. Moreover, bumpers 186 positioned on transparent panel 102 may assist in limiting undesirable movement of transparent panel 102 within perimeter frame 104. In certain exemplary embodiments, bumpers 186 may be made of a rubber material, or any other suitable elastic, viscoelastic, or resilient material.

A lid assembly 100 in accordance with the present disclosure may allow for a lighter and more durable lid assembly 100. More particularly, a lid assembly 100 in accordance with the present disclosure includes a transparent panel 102 as a main structural component of the lid assembly 100 by attaching transparent panel 102 directly to hinge brackets 106. Accordingly, a force on the transparent panel 102 may be transferred from the transparent panel 102 directly to hinge brackets 106 and from hinge brackets 106 to cabinet 52 of wash machine appliance 50. Further, by including bumpers 186 at front end 108 of lid assembly 100, the entire weight of lid assembly 100, and any forces thereon, may be supported by transparent panel 102. For example, any force on the lid assembly 100 may be routed through transparent panel 102 to cabinet 52.

Figure 15:
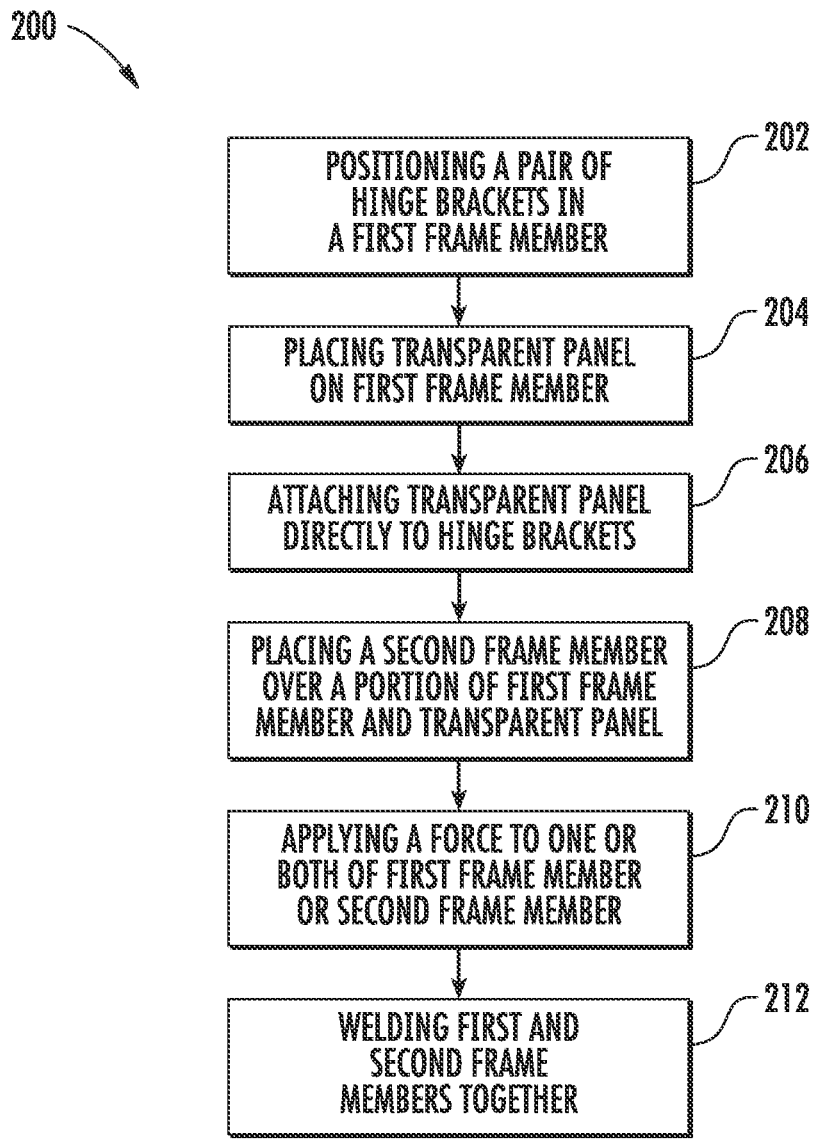
FIG. 15 provides a flow diagram of a method for manufacturing a lid assembly for a washing machine appliance in accordance with an exemplary aspect of the present subject matter

Referring now to FIG. 15, a flow diagram of a method (200) for manufacturing a lid assembly for a washing machine appliance is provided in accordance with an exemplary aspect of the present disclosure. The exemplary method (200) includes at (202) positioning a pair of hinge brackets in respective seats defined by a first frame member of a perimeter frame. Each of the respective hinge brackets may define a top surface with an amount of adhesive positioned thereon. The exemplary method (200) further includes at (204) placing a transparent panel on the first frame member of the perimeter frame and at (206) attaching the transparent panel directly to the pair of hinge brackets. More specifically, the transparent panel is attached directly to the pair of hinge brackets using the amount of adhesive positioned on the top surfaces of the respective hinge brackets.

The exemplary method (200) further includes at (208) placing a second frame member of the perimeter frame over the first frame member of the perimeter frame and over at least a portion of the transparent panel. In certain exemplary aspects of the present disclosure the first frame member may be a bottom frame member and the second frame member may be a top frame member. Accordingly, for the method of FIG. 15, the lid assembly may be assembled using bottom frame member as a base.

The exemplary method (200) of FIG. 15 further includes at (210) applying a force to one or both of the first frame member and the second frame member such that an inside lip of the second frame member is pressed against the transparent panel. Additionally, the exemplary method (200) of FIG. 15 includes at (212) welding the first and second frame members together such that the inside lip of the second frame member remains pressed against the transparent panel and forms a seal with the transparent panel. More particularly, the method (200) at (212) may include ultrasonically welding the first and second frame members together, or alternatively hot plate welding the first and second frame members together. Moreover, in certain exemplary aspects, welding the first and second frame members together at (212) may include welding second frame member to a rib on the first frame member.

Referring still to FIG. 15, the exemplary method (200) may further include attaching a trim member to one or both of the top frame member and the bottom frame member to conceal the top frame member at a front side of the lid assembly. Moreover, the exemplary method (200) may further include positioning a pair of bumpers on a bottom surface of the transparent panel at a front end of the lid assembly. Bumpers may be configured to contact a cabinet of the wash machine appliance when the lid assembly assemblies in a closed position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance defining a vertical direction, the washing machine appliance comprising:
    a cabinet defining a top end along the vertical direction;
    a tub positioned within the cabinet;
    a basket rotatably mounted within the tub, the cabinet defining an opening at the top end to allow a user to access the basket; and
    a lid assembly positioned over the opening of the cabinet, the lid assembly comprising
        a perimeter frame;

a pair of hinge brackets positioned at least partially in the perimeter frame, the hinge brackets attaching the lid assembly to the cabinet over the opening of the cabinet, wherein each hinge bracket includes a base having a surface; and a transparent panel attached directly to the surface of the base of each of the hinge brackets.

2. The washing machine appliance of claim 1, wherein the hinge brackets each comprise an L-bracket and a hinge pin, the L-bracket and hinge pin of each hinge bracket rigidly attached to one another, and the L-bracket includes the base.

3. The washing machine appliance of claim 1, wherein the transparent panel is attached directly to the surface of the base of each of the hinge brackets using an adhesive, such that the adhesive extends between the transparent panel and surface of the base of each of the hinge brackets.

4. The washing machine appliance of claim 3, wherein the perimeter frame includes a seat for each of the hinge brackets, and wherein the perimeter frame defines an overflow channel proximate to each seat for receipt of excess adhesive.

5. The washing machine appliance of claim 3, wherein the perimeter frame includes means for offsetting the transparent panel from the surface of the base of the hinge brackets.

6. The washing machine appliance of claim 5, wherein the transparent panel is offset from the surface of the base of the hinge brackets between about two (2) thousandths of an inch and about fifty (50) thousandths of an inch.

7. The washing machine appliance of claim 3, wherein the surface of the base of each hinge bracket defines an attachment area with the adhesive greater than or equal to about one square inch.

8. The washing machine appliance of claim 3, wherein the surface of the base of each of the hinge brackets is a top surface, and wherein each of the hinge assemblies are attached to directly to the transparent panel only the top surface of the bases of the hinge brackets.

9. The washing machine appliance of claim 3, wherein each of the hinge brackets are attached to directly to a bottom side of the transparent panel.

10. The washing machine appliance of claim 3, wherein the L-bracket and the hinge pin are each formed of a metal material.

11. The washing machine appliance of claim 1, wherein the lid assembly defines a front end and a rear end and further comprises a pair of bumpers positioned on a bottom surface of the transparent panel, wherein the hinge brackets are attached to the transparent panel at the rear end of the lid assembly, and wherein the bumpers are positioned adjacent to the bottom surface of the transparent panel at the front end of the lid assembly, the bumpers configured to contact the cabinet of the washing machine appliance.

12. The washing machine appliance of claim 1, wherein the perimeter frame includes a bottom frame member and a top frame member, wherein the bottom frame member and the top frame member are attached using ultrasonic welding.

13. The washing machine appliance of claim 12, wherein the top frame member of the perimeter frame includes an inside lip positioned at least partially over the transparent panel, wherein top frame member and the bottom frame member are attached with the inside lip deformed by the transparent panel such that the inside lip is pressed against and forms a seal with the transparent panel.

14. The washing machine appliance of claim 12, wherein the top frame member is comprised of a plastic including metallic flake, and wherein the top frame member is formed by molding.

15. The washing machine appliance of claim 1, wherein the surface of the base of each of the hinge brackets is a top surface, wherein the perimeter frame includes a bottom frame member and a top frame member, wherein the bottom frame member includes an offset member, and wherein the transparent panel rests on a top of the offset member such that the transparent panel is offset from the top surface of the base of each of the hinge brackets.

16. The washing machine appliance of claim 15, wherein the offset member is a ridge.

* * * * *